(12) United States Patent
Flehmig

(10) Patent No.: US 9,272,318 B2
(45) Date of Patent: Mar. 1, 2016

(54) METHOD FOR PRODUCING A HOLLOW PROFILED SECTION

(71) Applicant: Thomas Flehmig, Ratingen (DE)

(72) Inventor: Thomas Flehmig, Ratingen (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 429 days.

(21) Appl. No.: 13/679,387

(22) Filed: Nov. 16, 2012

(65) Prior Publication Data

US 2013/0104368 A1 May 2, 2013

Related U.S. Application Data

(63) Continuation of application No. PCT/EP2011/056642, filed on Apr. 27, 2011.

(30) Foreign Application Priority Data

May 19, 2010 (DE) .......................... 10 2010 017 022

(51) Int. Cl.
| | |
|---|---|
| B21D 22/02 | (2006.01) |
| B21C 37/08 | (2006.01) |
| B21C 37/16 | (2006.01) |
| B21C 37/29 | (2006.01) |
| B23P 11/00 | (2006.01) |

(52) U.S. Cl.
CPC ............ B21D 22/02 (2013.01); B21C 37/0815 (2013.01); B21C 37/16 (2013.01); B21C 37/296 (2013.01); B21D 22/025 (2013.01); B23P 11/00 (2013.01); *Y10T 29/4943* (2015.01); *Y10T 29/49398* (2015.01); *Y10T 29/49428* (2015.01); *Y10T 29/49442* (2015.01)

(58) Field of Classification Search
CPC ...... B21D 22/02; B21D 22/025; B23P 11/00; B21C 37/16; B21C 37/0815; B21C 37/296; Y10T 29/4943; Y10T 29/49428; Y10T 29/49398; Y10T 29/49442
See application file for complete search history.

(56) References Cited

U.S. PATENT DOCUMENTS

| | | | | |
|---|---|---|---|---|
| 6,694,616 | B1 * | 2/2004 | McKenna | 29/890.148 |
| 7,343,678 | B2 * | 3/2008 | Bien et al. | 29/890.08 |
| 2007/0175261 | A1 * | 8/2007 | Hornig et al. | 72/379.4 |

FOREIGN PATENT DOCUMENTS

| | | |
|---|---|---|
| CN | 1473086 A | 2/2004 |
| CN | 1816402 A | 8/2006 |
| CN | 101065197 A | 10/2007 |
| CN | 101300088 A | 11/2008 |
| DE | 938665 C | 2/1956 |
| DE | 102004025857 A1 | 12/2005 |

(Continued)

*Primary Examiner* — Ryan J Walters
(74) *Attorney, Agent, or Firm* — Reinhart Boerner Van Deuren P.C.

(57) ABSTRACT

The object of setting out a method, with which substantially crack and/or fold-free greatly curved hollow profiles can be produced, is achieved by a method for producing a hollow profile having a curved portion which has a center of curvature, wherein a blank is preshaped to form a U-shaped profile by introducing a punch into a first die and the U-shaped profile is shaped with a second die to form an O-shaped profile having at least one longitudinal slot, the blank being preshaped to form a U-shaped profile whose outer limb which faces away from the center of curvature and which is associated with the curved portion is at least partially higher than the inner limb thereof which faces the center of curvature and which is associated with the curved portion.

12 Claims, 5 Drawing Sheets

(56) References Cited

FOREIGN PATENT DOCUMENTS

| | | |
|---|---|---|
| DE | 102008022402 A1 | 11/2009 |
| JP | 507717 * | 1/1975 |
| JP | 63-278614 | 11/1988 |
| JP | 07-088575 | 4/1995 |
| JP | 2002-239651 | 8/2002 |
| WO | WO 95/02474 A1 | 1/1995 |
| WO | WO 00/61311 A1 | 10/2000 |

* cited by examiner

METHOD FOR PRODUCING A HOLLOW PROFILED SECTION

CROSS-REFERENCE TO RELATED PATENT APPLICATIONS

This patent application is a continuation of PCT/EP2011/056642, filed Apr. 27, 2011, which claims priority to German Application No. 102010017022.4, filed May 19, 2010, the entire teachings and disclosure of which are incorporated herein by reference thereto.

BACKGROUND OF THE INVENTION

The present invention relates to a method for producing a hollow profile having a curved portion which has a centre of curvature, wherein a blank is preshaped to form a U-shaped profile by introducing a punch into a first die and the U-shaped profile is shaped with a second die to form an O-shaped profile having at least one longitudinal slot. The invention also relates to a support core for carrying out the method. Finally, the subject-matter of the invention is also a hollow profile having a curved portion which has a centre of curvature.

A method for producing a hollow profile having a curved portion is described, for example, in DE 10 2004 025 857 A1. In the known method, there is first produced a flat blank which has a first elongate region, an adjacent transition region and a second elongate region which is adjacent thereto. A first longitudinal centre line of the first region extends in this instance in an angled manner with respect to a second longitudinal centre line of the second elongate region. The material pre-cut is then preshaped along the first region, the transition region and the second region to form a U-shaped profile which extends in the longitudinal direction in a rounded angular manner and which has limbs of substantially the same length. Subsequently, the U-shaped profile is further shaped to form an O-shaped profile and the adjacent edges of the O-shaped profile located centrally at the highest point are welded together. It has been found that, with the production of particularly more greatly curved hollow bodies with the known method, cracks or folds may occur in the curved portion.

SUMMARY OF THE INVENTION

Based on this, an object of the invention is therefore to provide a method by means of which substantially crack and/or fold-free hollow profiles having a higher level of curvature can be produced and a corresponding hollow profile. A support core for carrying out the method is also intended to be provided.

In accordance with a first teaching, this object is achieved by a method for producing a hollow profile having a curved portion which has a centre of curvature in which a blank is preshaped to form a U-shaped profile by introducing a punch into a first die and the U-shaped profile is shaped with a second die to form an O-shaped profile having at least one longitudinal slot, the blank being preshaped to form a U-shaped profile whose outer limb which faces away from the centre of curvature and which is associated with the curved portion is at least partially higher than the inner limb thereof which faces the centre of curvature and which is associated with the curved portion. With the outer limb which is higher at least partially or in regions, more material is provided at the location at which the U-shaped profile, during shaping to form an O-shaped profile having a longitudinal slot, is subjected to relatively high levels of expansion. The risk of expansion cracks in those regions with more greatly curved hollow bodies can consequently be reduced. In addition, this procedure allows the use of specific materials which are optimised with respect to their expansion behaviour to be dispensed with.

It is consequently possible to select particularly cost-effective, light or also high-strength materials as a material for the hollow body.

According to a first embodiment of the method, owing to the preshaping of the blank to form a U-shaped profile and/or the shaping of the U-shaped profile to form an O-shaped profile having a longitudinal slot, a recess which is provided in the region of the blank associated with the outer limb is narrowed to form a mitre slot. In this manner, the formation of waves or folds in the outer limb by means of compression strains can be counteracted.

Another development of the method makes provision for the U-shaped profile to be shaped to form an O-shaped profile having at least one longitudinal slot and a mitre slot which are connected to each other. Greater radii of curvature are on the one hand thereby enabled. Longitudinal and mitre slots which are connected to each other can further simplify the materially integral connection of the edges since the opposing edges can be brought into the welding position with smaller tensions in the hollow profile. The edges of the component to be produced can thereby readily be joined together and welded.

In another embodiment, the longitudinal slot and/or the mitre slot of the O-shaped profile is/are closed by means of materially engaging connection, in particular adhesive bonding, soldering, welding, of the edges to form a longitudinal seam and/or a mitre seam. By closing the slots, the resistance of the hollow profile in the event of loads can be further increased. Hollow profiles having a cross-section which is closed in this manner can be used in particular for the production of components of motor vehicles which serve to protect occupants.

The method can be further developed in that, prior to the shaping of the U-shaped profile to form an O-shaped profile having a longitudinal slot, a support core, in particular a structured support core, is introduced, in particular laterally pushed, into the U-shaped profile. With the support core, buckling of the outer limb and/or inner limb when the U-shaped profile is shaped to form an O-shaped profile having a longitudinal slot can be prevented. In addition, the dimensional accuracy of the hollow profile produced can be improved. A structured support core can be removed without being destroyed after shaping to form an O-shaped profile having a longitudinal slot and can therefore be used several times.

A next embodiment makes provision for a support core having at least one shaping element to be used and for the shaping element to be deployed before or after the support core has been introduced into the U-shaped profile. The shaping element can be used in this instance to support undercut portions from the inner side during the shaping of the U-shaped profile to form an O-shaped profile. A deployment of the shaping element only after the support core has been introduced allows more flexible selection of the insertion direction of the support core into the U-shaped profile. For example, the support core can also be introduced from one direction into the U-shaped profile whose cross-section does not allow insertion with a deployed shaping element. On the other hand, in the case of a shaping element which has already been deployed in the U-shaped profile before the support core is introduced, the precise position thereof can be better controlled.

In another embodiment, the support core is pulled before or after the slot of the O-shaped profile has been closed by means of materially engaging connection of the edges of the O-shaped profile. Pulling before the connection may simplify the removal of the support core. For example, the risk of an inadvertent materially engaging connection of the support core to the O-shaped profile is reduced. On the other hand, pulling of the support core enables a higher level of dimensional accuracy of the hollow profile to be produced.

In a next development, the hollow profile is produced from a blank which is constructed as a "Tailored Blank" or as a "Patchwork Blank". The term "Tailored Blanks" refers to blanks which are assembled from single metal sheets of differing thickness, strength and/or surface-coating. On the one hand, at locations with a relatively high load, a thicker and/or stronger material can thereby be used. On the other hand, thinner or softer metal sheets can be used at the other locations. Tailored blanks consequently enable a reduction in weight. In addition, they allow high-value and expensive materials to be used only at the really necessary locations so that cost savings can be achieved. With "Patchwork Blanks", base blanks are locally strengthened by individual additional reinforcement metal sheets being secured. Base blanks and reinforcement metal sheets can subsequently be readily shaped together. The operationally complex and costly fitting of reinforcements to the subsequent component can consequently be dispensed with. As base blanks for Patchwork Blanks, it is also in particular possible to consider Tailored Blanks, small local reinforcements being able to be provided with the reinforcement metal sheets so that, for the individual metal sheets of the "Tailored Blank", a further reduced thickness or another material can be selected. Of course, the blank may also be constructed in a monolithic manner as a "Tailored Rolled Blank", that is, comprise a single material and, in the case of the "Tailored Rolled Blank", have different material thicknesses. Steels/steel alloys are preferably used.

Furthermore, in one embodiment of the method, a hollow profile is produced with or without a flange. At the flanges of hollow profiles having flanges, they can be readily connected to other components in a materially engaging and/or positive-locking manner. In particular, adhesively-bonded connections can be enabled by providing an adequate adhesive face on the flange. On the other hand, weight can be saved with flange-free hollow profiles. However, hollow profiles with or without flanges can also be connected to other components in a process-reliable manner, for example, by means of laser welding.

Finally, a development of the method makes provision for the blank to be trimmed and/or perforated during the preshaping to form a U-shaped profile and/or during shaping of the U-shaped profile to form an O-shaped profile having at least one longitudinal slot. A trimming or perforation of the hollow profile may be necessary, for example, when, for example, additional elements, for example, cables are intended to be laid through the hollow profile. Owing to the integration of the perforation and/or trimming in the preshaping or shaping process, the number of operating steps required to produce a hollow profile can be further reduced. A reduction of the operating steps enables shorter cycle times and consequently more cost-effective production of the hollow profiles.

According to a second teaching, the above-mentioned object is achieved by means of a support core which has at least one core element having at least one shaping element which can be deployed.

In a first embodiment, the support core has at least two core elements. A support core which has at least two parts also enables complex, for example, intersecting hollow profiles to be supported from the inner side during the shaping of a U-shaped profile to form an O-shaped profile having a longitudinal slot and can nonetheless be pulled in a simple manner after the forming of the O-shaped profile or after the closure of the longitudinal slot.

According to another teaching of the invention, the above-mentioned object is achieved by a hollow profile which has a first longitudinal slot or a first longitudinal seam and the first longitudinal slot or the first longitudinal seam in the curved portion extends in a manner displaced in an eccentric manner towards the centre of curvature. The displaced longitudinal seam brings about a reduction of the expansion tensions remaining in the hollow profile.

In a first embodiment, the hollow profile has another longitudinal slot or another longitudinal seam and/or a mitre slot or a mitre seam and the other longitudinal slot or the other longitudinal seam and/or the mitre slot or the mitre seam are connected to the first longitudinal slot or the first longitudinal seam. Such a hollow profile in accordance with the production process can be produced in a particularly cost-effective manner.

According to another development, the hollow profile is produced from a monolithic blank, a Tailored Blank or a Patchwork Blank. With respect to the advantages connected therewith, reference is made to the statements relating to the method according to the invention.

One embodiment further makes provision for the hollow profile to have at least one internal undercut portion. Internal undercut portions allow, for example, the hollow profile to be stiffened in this region. Internal undercut portions may also serve to receive a connection element, for example, a screw head.

Finally, the hollow profile can be developed in that it is constructed as an intersection, in particular as a T-piece. The term intersections is used in the context of the invention to refer to hollow profiles which are composed of a plurality of tubular portions, the tubular portions being connected to each other in such a manner that they form a coherent inner space. In the most simple case, another tubular portion branches perpendicularly from an elongate tubular portion so that a hollow profile in the form of a T-piece is formed. However, intersections may also refer inter alia to cross-like or Y-shaped hollow profiles. Using intersections, it is readily possible to form bearing structures, for example, for motor vehicle bodyworks which are distinguished by a low weight.

BRIEF DESCRIPTION OF THE DRAWINGS

The invention is intended to be explained in greater detail below with reference to embodiments and drawings.

In the drawings.

DETAILED DESCRIPTION OF THE INVENTION

Figure 1:
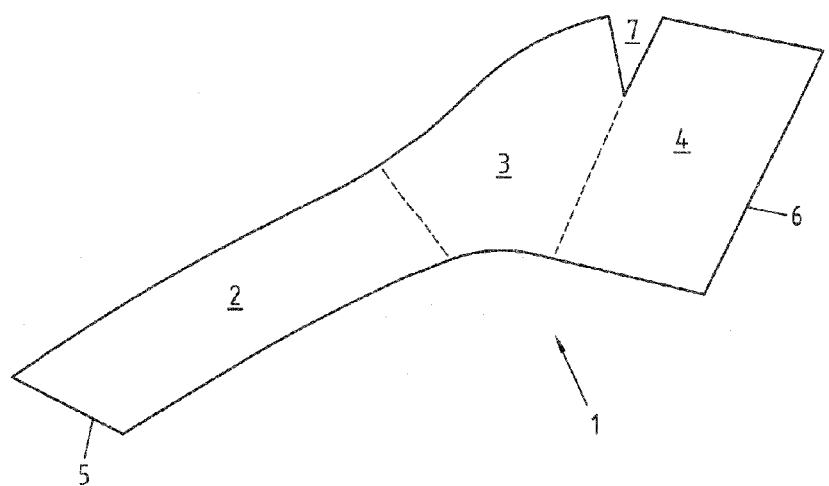
FIG. 1 shows a first blank for producing a hollow profile.

The blank 1 which is illustrated as a perspective view in FIG. 1 has a first substantially perpendicular region 2, an adjacent transition region 3 and an adjacent second substantially rectangular region 4. The edges 5 and 6, after the shaping, form the lateral closure of the hollow profile to be produced. A recess 7 is provided in the transition region of the blank 1. The blank 1 shown is a Tailored Blank.

Figure 2:
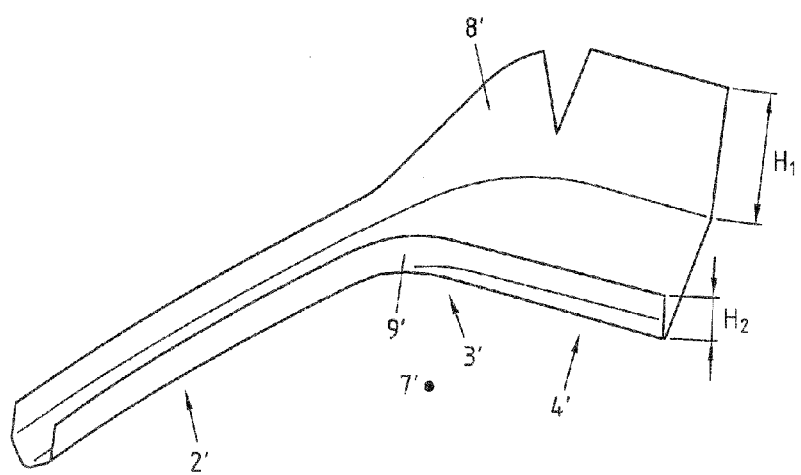
FIG. 2 shows the first blank shown in FIG. 1 shaped to form a first U-shaped profile.

In a first method step, the blank 1 is preshaped by introducing a stamp (not shown) into a first die which is also not shown to form the U-shaped profile 1' illustrated in FIG. 2. The U-shaped profile has a longitudinal portion 2' which corresponds to the first substantially perpendicular region 2 and a longitudinal portion 4' which corresponds to the second substantially perpendicular region 4. The transition region 3 has been preshaped to form a curved portion 3' having a centre of curvature 7'. The outer limb 8' facing away from the centre of curvature 7' is at least partially higher ($H_1$) than the inner limb 9' facing towards the centre of curvature ($H_2$).

Figure 3:
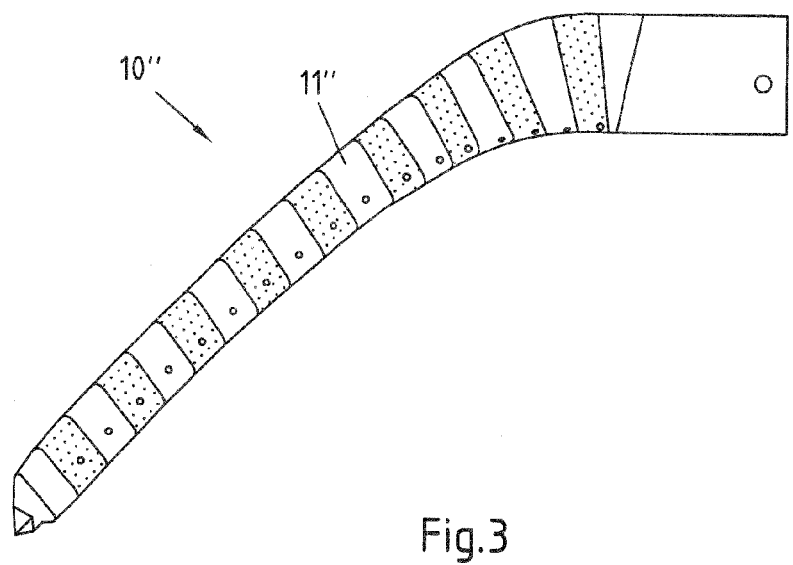
FIG. 3 shows a support core suitable for producing the hollow profile.

Into the U-shaped profile, the structured support core 10" shown in FIG. 3 is introduced in a direction parallel with the outer limb 8' and the inner limb 9' into the U-shaped profile 1'. During subsequent shaping of the U-shaped profile 1' into the O-shaped profile 1''' illustrated in FIG. 4 using a second die (not illustrated), the support core 10" supports the U-shaped profile 1' from the inner side so that, for example, the outer limb 8' or the inner limb 9' can be prevented from buckling inwards. The members 11" of the support core 10" that are rigidly connected to each other in the assembled state can be pulled apart in the longitudinal extent of the support core 10" and can then be bent relative to each other. The support core, after the shaping of the U-shaped profile 1' to form an O-shaped profile 1''' having a longitudinal slot, can consequently be laterally drawn from the O-shaped profile 1'''. During the shaping of the blank 1 to form a U-shaped profile 1' and further to form an O-shaped profile, the recess 7 is narrowed to form a mitre slot. This and the longitudinal slot are subsequently closed by laser welding the I-shaped joint formed to form a mitre seam 13''' and a longitudinal seam 12''' which is connected thereto. It is also conceivable to draw the support core 10" from the O-shaped profile 1''' only after the materially engaging closure of the longitudinal and/or mitre slot.

In the region of the lateral end regions of the O-shaped profile 1''', there are no compressions or expansions since they can be unwound to form the corresponding regions 2 and 4 of the blank. If a larger face for connecting the O-shaped profile 1''' shown to other components is desired, using the method according to the invention it is also possible to produce instead of the flange-free end regions shown end regions which have a flange. Furthermore, with more complex components, there can be provided a plurality of recesses which are narrowed to form a plurality of mitre slots when a component is shaped and which are closed by means of welding to form a plurality of mitre seams.

Figure 5:
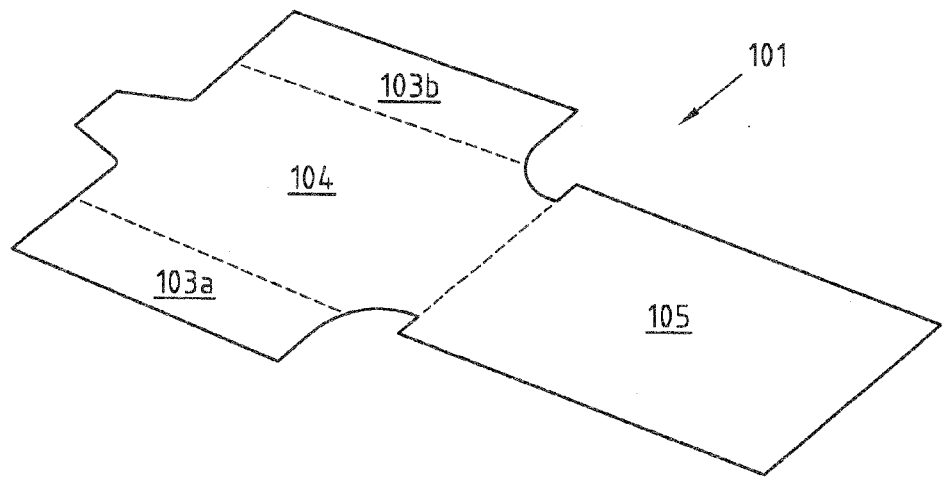
FIG. 5 shows a second blank for producing a hollow profile.

FIG. 5 illustrates another blank 101 for producing a hollow profile having two curved portions. The blank 101 is provided to be shaped to form a T-shaped hollow profile. It has a first substantially rectangular region 103a, an adjacent transition region 104 and a second adjacent, substantially rectangular region 103b. In addition, there is provided a third substantially rectangular region 105 which is laterally in contact with the transition region 104.

Figure 6:
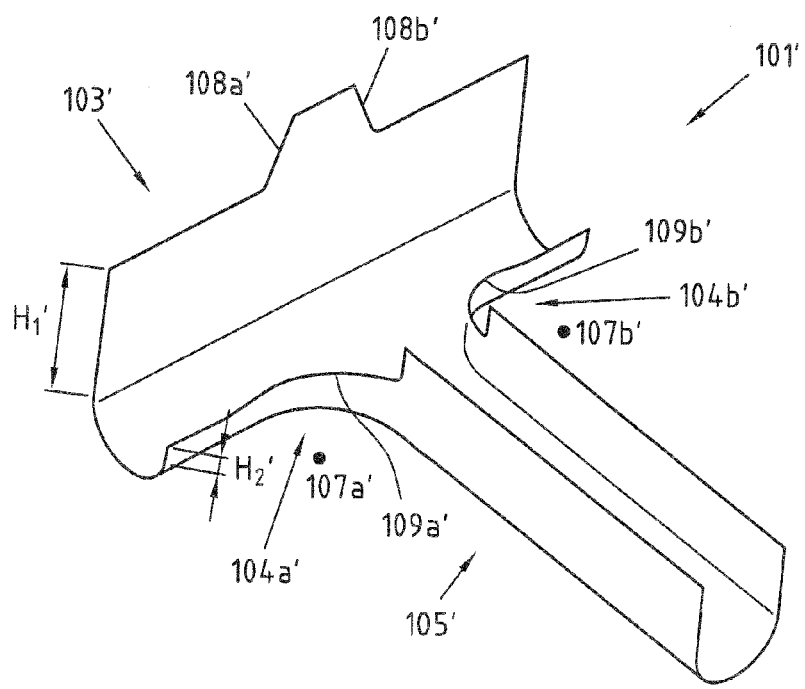
FIG. 6 shows the second blank shown in FIG. 5 shaped to form a second U-shaped profile.

The blank 101 is first arranged in a device which is not illustrated between a stamp and a first die and preshaped to form the U-shaped profile 101' illustrated in FIG. 6 by moving together the stamp and first die. The U-shaped profile 101' has a T-shaped structure, the perpendicular portion 105' of the T being formed by the third substantially rectangular region 105. The perpendicular portion 105' then merges, via two curved portions 104a', 104b' which are formed from the transition region and with each of which a centre of curvature 107a', 107b' is associated, into the horizontal portion 103' of the T which is formed by the first and second substantially rectangular region 103a, 103b of the blank 101. The outer limb 108a', 108b' of the U-shaped profile 101' facing away from the respective centre of curvature 107a', 107b' is in the present embodiment continuously higher ($H_1'$) than the inner limb 109a', 109b' ($H_2'$) facing the respective centre of curvature 107a', 107b'. However, it is also conceivable for the outer limb facing away from the centre of curvature to be higher only partially or in regions than the inner limb facing the centre of curvature.

Figure 7:
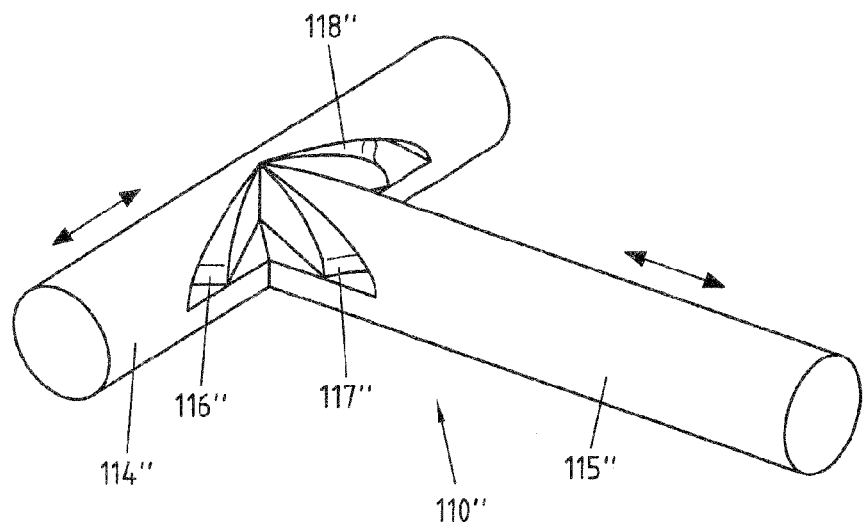
FIG. 7 shows a core suitable for producing the second hollow profile shown in FIG. 6 in the removed state.
Figure 8:
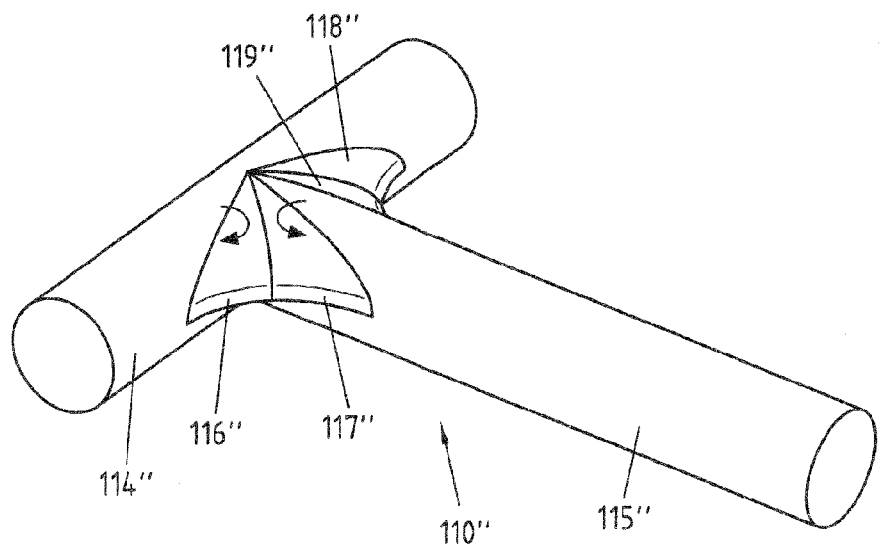
FIG. 8 shows the core shown in FIG. 7 in the shaping state.

The support core 110" illustrated in FIGS. 7 and 8 is then introduced into the preshaped U-shaped profile 101'. The support core 110" is composed of a first core element 114" and a second core element 115". Both the first core element 114" and the second core element 115" each have redirectable shaping elements 116", 118" or 117", 119". The support core 110" is introduced into the U-shaped profile 101' by the first core element 114" first being laterally pushed with the introduced shaping elements 116", 118" in the direction of the horizontal portion 103' of the T. Subsequently, the second core element 115", also with the shaping elements 117", 119" introduced, is pushed into the U-shaped profile 101' in the direction of the perpendicular portion 105' of the T so that it adjoins the first core element 114" in a flush manner. In this arrangement of the core elements 114", 115", the shaping elements 116", 117", 118", 119" are deployed as illustrated in FIG. 8.

Figure 9:
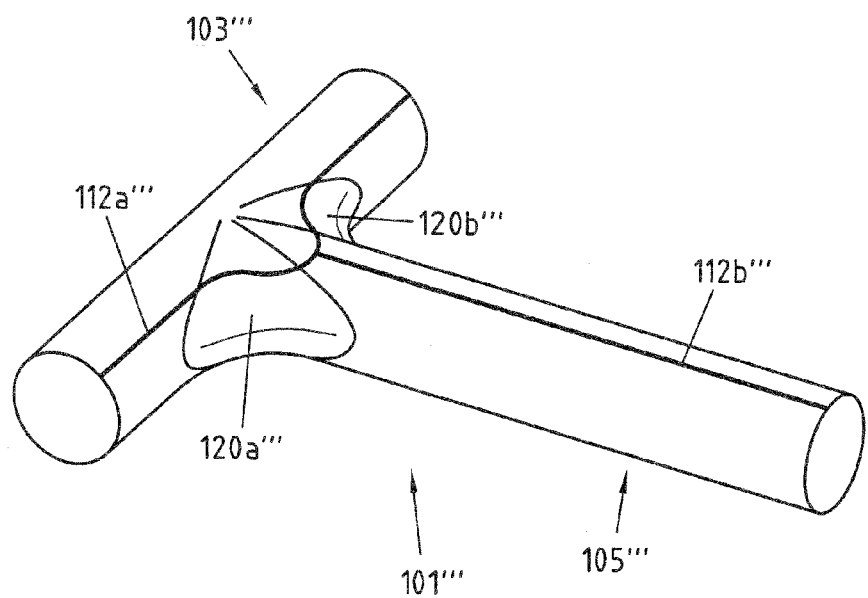
FIG. 9 shows a second embodiment of a hollow profile according to the invention produced from the U-shaped profile shown in FIG. 6.

In the next method step, using a second die which is not illustrated, the U-shaped profile 101' is shaped to form the O-shaped profile 101''' which is shown in FIG. 9 and which has a first longitudinal slot 112a''' and a second longitudinal slot 112b''' which are connected to each other and are closed by means of laser welding. During the shaping of the undercut portions 120a''', 120b''', they are internally supported by the shaping elements 116", 117", 118", 119". The undercut portions 120a''', 120b''' support the connection region of the perpendicular portion 105''' and horizontal portion 103''' of the T so that forces acting perpendicularly relative to the perpendicular portion 105''' of the O-shaped profile 101''' can also be reliably introduced into the horizontal portion 103'''. Before or after the welding of the edges, the shaping elements 116", 117" 118", 119" are introduced again and the core elements 114", 115" are pulled from the hollow profile 101''' counter to the respective insertion direction.

Figure 4:
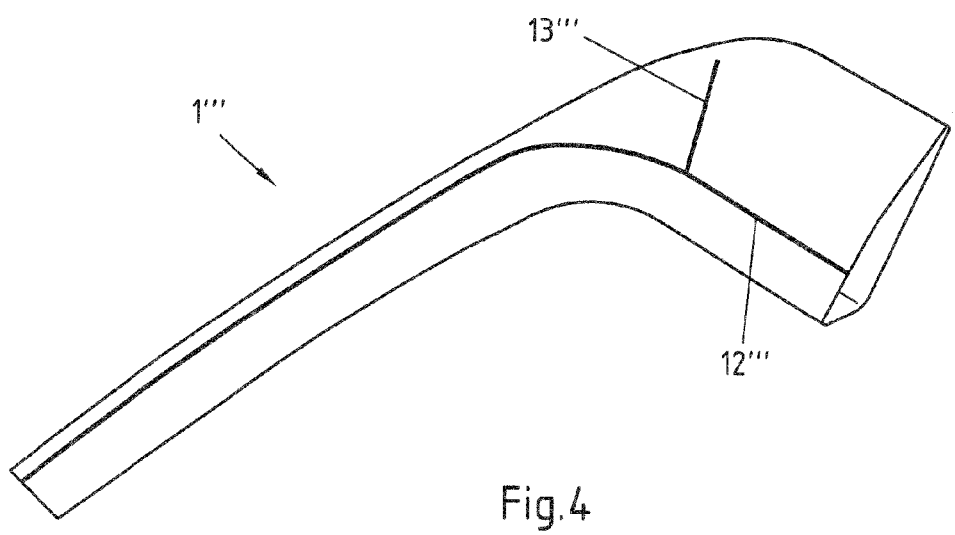
FIG. 4 shows a first embodiment of a hollow profile according to the invention produced from the U-shaped profile shown in FIG. 2.

In order to produce the hollow profile 1''', 101''' shown in FIGS. 4 and 9, consequently, only a single force-intensive movement direction is necessary for the actual U/O shaping processes. The method can therefore be carried out with standardised and therefore cheaply available devices.

The invention claimed is:

1. Method for producing a hollow profile having a curved portion which has a center of curvature, wherein a blank is preshaped to form a U-shaped profile by introducing a punch into a first die and the U-shaped profile is shaped with a second die to form an O-shaped profile having at least one longitudinal slot, comprising the steps of:

preshaping the blank to form a U-shaped profile with an outer limb which faces away from a center of curvature of the U-shaped profile and which is arranged for forming the curved portion of the hollow profile and is at least partially higher than an inner limb of the U-shaped profile which faces the center of curvature and which is arranged for forming the curved portion of the hollow profile.

2. Method according to claim 1, wherein, by preshaping the blank to form a U-shaped profile and/or shaping the U-shaped profile to form an O-shaped profile having a longitudinal slot, a recess which is provided in a region of the blank, wherein the recess is adjacent the outer limb and is narrowed to form a miter slot.

3. Method according to claim 2, wherein the longitudinal slot and/or the miter slot of the O-shaped profile is/are closed by means of materially engaging connection.

4. Method according to claim 2, wherein the longitudinal slot and/or the miter slot of the O-shaped profile is/are closed by means of adhesive bonding, soldering, welding, of the edges to form a longitudinal seam and/or a miter seam.

5. Method according to claim 1, wherein the U-shaped profile is shaped to form an O-shaped profile having at least one longitudinal slot and a miter slot which are connected to each other.

6. Method according to claim 1, wherein, before the shaping of the U-shaped profile to form an O-shaped profile having a longitudinal slot, a support core is introduced. into the U-shaped profile.

7. Method according to claim 6, wherein a support core having at least one shaping element is used and the shaping element is deployed before or after the introduction.

8. Method according to claim 6, wherein the support core is pulled before or after the closure of the slot of the O-shaped profile by means of materially engaging connection of the edges of the O-shaped profile, a shaping element being introduced before the pulling when a support core having the shaping element is used.

9. Method according to claim 1, wherein the hollow profile is produced from the blank which is constructed as a Tailored Blank or a Patchwork Blank.

10. Method according to claim 1, wherein the hollow profile produced is one of a hollow profile with a flange or a flange-free hollow profile.

11. Method according to claim 1, wherein the blank is trimmed and/or perforated during the preshaping to form a U-shaped profile and/or during a closure to form an O-shaped profile having a longitudinal slot.

12. Method according to claim 1, wherein, before the shaping of the U-shaped profile to form an O-shaped profile having a longitudinal slot, a structured support core is laterally pushed into the U-shaped profile.

* * * * *